(12) United States Patent
Kawano

(10) Patent No.: US 10,901,405 B2
(45) Date of Patent: Jan. 26, 2021

(54) MANUFACTURING PROCESS ANALYSIS METHOD

(71) Applicant: MITSUBISHI CHEMICAL ENGINEERING CORPORATION, Tokyo (JP)

(72) Inventor: Kouji Kawano, Tokyo (JP)

(73) Assignee: Mitsubishi Chemical Engineering Corp., Tokyo (JP)

( * ) Notice: Subject to any disclaimer, the term of this patent is extended or adjusted under 35 U.S.C. 154(b) by 230 days.

(21) Appl. No.: 16/081,978

(22) PCT Filed: Mar. 6, 2017

(86) PCT No.: PCT/JP2017/008683
§ 371 (c)(1),
(2) Date: Jan. 14, 2019

(87) PCT Pub. No.: WO2017/154814
PCT Pub. Date: Sep. 14, 2017

(65) Prior Publication Data
US 2019/0129402 A1    May 2, 2019

(30) Foreign Application Priority Data

Mar. 8, 2016   (JP) ................................ 2016-045026

(51) Int. Cl.
*G05B 23/02*   (2006.01)
*G06Q 50/04*   (2012.01)
(Continued)

(52) U.S. Cl.
CPC ....... *G05B 23/0218* (2013.01); *G05B 19/406* (2013.01); *G05B 19/418* (2013.01);
(Continued)

(58) Field of Classification Search
CPC .............. G05B 23/0218; G05B 19/406; G05B 19/418; G05B 23/02; G05B 19/4184;
(Continued)

(56) References Cited

U.S. PATENT DOCUMENTS 5,442,562 A    8/1995  Hopkins et al. ............... 364/468
5,635,850 A *  6/1997  Ogura ..................... H01L 22/20
                                              324/760

(Continued)

FOREIGN PATENT DOCUMENTS

| JP | H07-200040  | 8/1995 |
| JP | 2003 114713 | 4/2003 |
| JP | 2009 021348 | 1/2009 |

OTHER PUBLICATIONS

International Search report dated May 16, 2017 in PCT/JP2017/008683; 1 pages, English translation.

*Primary Examiner* — Thomas C Lee
*Assistant Examiner* — Charles Cai
(74) *Attorney, Agent, or Firm* — Fattibene and Fattibene LLC; Paul A. Fattibene

(57) ABSTRACT

To provide a manufacturing process analysis method for specifying a hindering factor that causes a variation in product performance and for stabilizing product performance. A manufacturing process analysis method comprises: a step for collecting product data indicating the quality of a product and process data indicating manufacturing conditions of a product; a step for standardizing the process data so that the data are converted into an intermediate function; a step for performing principal component analysis on the intermediate function to derive a principal component load amount and a principal component score of the process data; a step for applying cluster analysis to the principal component score to classify manufacturing process lots into a plurality of groups; a step for determining relative (Continued)

merit of each group on the basis of product data soundness corresponding to the principal component score belonging to the group; and a step for specifying a hindering factor that contributes to the relative merit of the group.

8 Claims, 13 Drawing Sheets

(51) Int. Cl.
*G05B 19/418* (2006.01)
*G05B 19/406* (2006.01)
(52) U.S. Cl.
CPC .............. *G05B 23/02* (2013.01); *G06Q 50/04* (2013.01); *G05B 2219/32179* (2013.01); *Y02P 90/02* (2015.11); *Y02P 90/30* (2015.11)
(58) Field of Classification Search
CPC .......... G05B 19/41865; G05B 23/0254; G05B 2219/32179; G05B 19/41875; G05B 23/024; Y02P 90/02; Y02P 90/30; Y02P 90/22; H01L 22/20; G06F 17/18; G06F 16/00; G06Q 50/04; G06Q 10/04; G06Q 30/02; G06Q 30/0204; G06Q 30/0201; G06Q 10/06; G06T 11/206
See application file for complete search history.

(56) References Cited

U.S. PATENT DOCUMENTS

| | | | |
|---|---|---|---|
| 2008/0232670 A1* | 9/2008 | Li ..................... | G05B 19/4184 382/141 |
| 2013/0144419 A1* | 6/2013 | Tsai ...................... | H01L 22/20 700/108 |
| 2013/0173042 A1* | 7/2013 | Morisawa .......... | G05B 19/4184 700/121 |
| 2015/0234379 A1* | 8/2015 | Vajaria ................ | G05B 19/418 700/121 |

* cited by examiner

| LOT NUMBER | PROCESS DATA ||||||| PRODUCT DATA ||||
|---|---|---|---|---|---|---|---|---|---|---|---|
| | para01 | para02 | para03 | para04 | para05 | ... | para28 | para29 | para30 | para31 |
| LOT001 | 1.526 | 0.036 | 0.113 | 0.780 | -0.061 | ... | -1.072 | 0.819 | -0.696 | -0.762 |
| LOT002 | 1.526 | 0.898 | 0.113 | 0.780 | -0.479 | ... | 1.326 | 0.528 | -0.444 | -0.416 |
| LOT003 | 1.526 | 0.036 | 0.925 | 0.420 | -0.479 | ... | 0.232 | 0.370 | -0.819 | -0.946 |
| LOT004 | 1.526 | 0.036 | 1.466 | 0.780 | -0.061 | ... | -0.652 | 0.264 | -1.003 | -1.244 |
| LOT005 | 1.526 | 0.898 | 1.198 | 1.140 | -0.688 | ... | 0.093 | 0.130 | -0.346 | -0.292 |
| LOT006 | 1.526 | 0.898 | 0.925 | 1.321 | -0.688 | ... | -1.449 | 0.244 | -0.142 | -0.043 |
| LOT007 | 1.526 | 0.898 | 1.466 | 1.681 | -0.061 | ... | -1.469 | -0.089 | -0.102 | 0.003 |
| LOT008 | -0.628 | -1.688 | -1.241 | -1.020 | -1.314 | ... | -0.456 | -0.232 | -0.515 | -0.511 |
| LOT009 | -0.628 | -1.688 | -1.241 | -1.020 | -0.688 | ... | 1.022 | 0.212 | -1.110 | -1.433 |
| LOT010 | -0.628 | -1.688 | -1.241 | -1.921 | -1.523 | ... | 1.308 | 0.288 | -0.783 | -0.881 |
| LOT011 | -0.628 | -0.826 | -1.241 | -1.020 | -1.314 | ... | 0.654 | -0.262 | -0.602 | -0.629 |
| LOT012 | -0.628 | -0.826 | 0.113 | -1.020 | -1.732 | ... | 1.369 | -2.044 | -0.651 | -0.698 |
| LOT013 | -0.628 | -0.826 | -1.241 | -1.381 | -1.314 | ... | -0.255 | -3.949 | 3.865 | 2.939 |
| LOT014 | -0.628 | 0.898 | 0.654 | -0.120 | 0.984 | ... | 0.577 | -0.009 | -0.223 | -0.140 |
| LOT015 | -0.628 | 0.036 | -2.584 | 1.681 | 0.984 | ... | -1.449 | 0.337 | -0.548 | -0.555 |
| LOT016 | -0.628 | 0.036 | 0.113 | -0.120 | 0.566 | ... | -0.407 | 0.173 | 0.450 | 0.600 |
| LOT017 | -0.628 | 0.036 | 0.384 | 0.240 | 0.775 | ... | 0.596 | 0.611 | 0.588 | 0.798 |
| LOT018 | -0.628 | 0.036 | 0.113 | -0.120 | 0.984 | ... | -0.482 | 0.642 | 0.578 | 0.728 |
| LOT019 | -0.628 | 1.760 | 0.113 | -0.120 | 0.984 | ... | 1.143 | 0.216 | 0.141 | 0.277 |
| LOT020 | -0.628 | 0.898 | 0.654 | 0.240 | 0.984 | ... | 1.104 | 0.088 | -0.101 | 0.005 |
| LOT021 | -0.628 | 0.898 | 0.113 | -1.020 | 0.984 | ... | 0.199 | 0.444 | 1.166 | 1.274 |
| LOT022 | -0.628 | 0.036 | 0.113 | -0.120 | 0.984 | ... | 0.560 | 0.571 | -0.267 | -0.193 |
| LOT023 | -0.628 | 0.898 | 0.113 | -0.840 | 1.610 | ... | -0.594 | 0.423 | 0.182 | 0.321 |
| LOT024 | -0.628 | -1.688 | 0.113 | 0.780 | 0.586 | ... | -1.898 | 0.224 | 1.862 | 1.888 |

FIG. 3

| | PC1 | PC2 | PC3 |
|---|---|---|---|
| para01 | −0.50548 | 0.839426 | 0.046511 |
| para02 | 0.450608 | 0.645317 | 0.19008 |
| para03 | 0.057786 | 0.690331 | −0.2298 |
| para04 | 0.111348 | 0.800874 | 0.040467 |
| para05 | 0.921982 | 0.279653 | −0.14266 |
| para06 | 0.8215 | −0.32061 | −0.14199 |
| para07 | −0.72722 | 0.487218 | −0.01372 |
| para08 | 0.659578 | −0.00942 | 0.649907 |
| para09 | 0.578827 | 0.334155 | 0.506804 |
| para10 | 0.441494 | 0.140056 | −0.77825 |
| para11 | 0.834972 | 0.185538 | −0.16753 |
| para12 | −0.54333 | −0.78366 | 0.139867 |
| para13 | −0.47162 | −0.75501 | 0.211614 |
| para14 | −0.70465 | 0.208836 | 0.497029 |
| para15 | −0.51217 | 0.175038 | 0.557167 |
| para16 | 0.923618 | 0.12208 | −0.31492 |
| para17 | 0.931699 | −0.28464 | −0.09748 |
| para18 | −0.59048 | 0.571166 | −0.28328 |
| para19 | −0.40834 | 0.722455 | −0.08283 |
| para20 | −0.93117 | −0.08617 | 0.071415 |
| para21 | −0.30667 | 0.915622 | 0.09457 |
| para22 | −0.9664 | 0.090281 | −0.13514 |
| para23 | −0.30426 | −0.38537 | −0.3932 |
| para24 | −0.94303 | −0.17717 | −0.21828 |
| para25 | −0.94401 | −0.17522 | −0.21709 |
| para26 | −0.94385 | −0.17744 | −0.21686 |
| para27 | 0.79622 | −0.14191 | 0.257566 |
| para28 | −0.05687 | −0.36131 | 0.158694 |

FIG. 4

| | PC1 | PC2 | PC3 |
|---|---|---|---|
| LOT001 | -2.4307 | 4.314588 | 1.407045 |
| LOT002 | -3.04385 | 3.761931 | 2.625437 |
| LOT003 | -3.25052 | 2.83354 | 0.340211 |
| LOT004 | -2.46103 | 2.854634 | -1.15237 |
| LOT005 | -3.01839 | 2.861903 | -1.04395 |
| LOT006 | -3.28453 | 3.049952 | -0.23903 |
| LOT007 | -2.23474 | 3.118138 | -1.12386 |
| LOT008 | -3.50434 | -3.71241 | -0.58701 |
| LOT009 | -3.65111 | -3.19557 | -2.10184 |
| LOT010 | -4.23542 | -3.72625 | -0.68437 |
| LOT011 | -3.17286 | -3.91006 | 2.228419 |
| LOT012 | -3.75385 | -2.57944 | 1.567694 |
| LOT013 | -3.75696 | -2.58815 | -0.09119 |
| LOT014 | 3.634634 | -0.60683 | 0.789444 |
| LOT015 | 3.912634 | -0.42246 | 2.104483 |
| LOT016 | 3.491872 | -0.71412 | 3.016072 |
| LOT017 | 4.232987 | -0.73303 | 0.304588 |
| LOT018 | 4.644278 | -0.76721 | 0.134477 |
| LOT019 | 5.182885 | 0.056869 | 1.256384 |
| LOT020 | 4.054245 | 0.258106 | -1.72132 |
| LOT021 | 4.087002 | 0.040512 | 0.059269 |
| LOT022 | 3.084271 | 0.230733 | -2.68525 |
| LOT023 | 3.619162 | 0.003536 | -1.81976 |
| LOT024 | 2.056057 | 0.051077 | -2.64347 |

FIG. 5

MANUFACTURING PROCESS ANALYSIS METHOD

TECHNICAL FIELD

The present invention relates to manufacturing process analysis methods of a product, in particular, to a manufacturing process analysis method of a manufacturing process for specifying a factor of variation of the product performance and the manufacturing performance.

BACKGROUND ART

In manufacturing plants, and the like, the products are manufactured based on the same manufacturing process. The performance of the product is substantially uniform within the same lot, but variation is known to occur in the performance of the product between lots. In other words, although the products are manufactured based on the same manufacturing process, the performance of the product may vary.

In order to suppress such variation in the product performance, diagnosing abnormality using multivariable analysis is known (see e.g., patent document 1). A control method of the manufacturing process described in patent document 1 processes manufacturing condition and product performance based on the multivariable analysis method, determines whether or not the manufacturing condition and the product performance are within a predetermined limit, and if outside the limit, corrects the manufacturing condition so as to be within the limit.

PRIOR ART REFERENCES

Patent Documents

Patent document 1: Japanese Unexamined Patent Publication No. 07-200040

Non-patent Documents

DISCLOSURE OF THE INVENTION

Problems to be Solved by the Invention

The conventional technique described above, however, has problems in that the product performance needs to be acquired beforehand and that abnormality diagnosis becomes difficult to carry out in real time as the abnormality diagnosis is carried out in a state the manufacturing condition and the product performance coexist in an alternate variable processed through a multivariable analysis method.

Furthermore, the conventional technique described above carries out the abnormality diagnosis so as to exclude defective products, and does not take into consideration high and low quality of the product determined as non-defective, and thus has a problem in that it does not contribute to stably supplying a higher quality product.

A technical problem to be solved to specify a hindering factor that causes variation of the product performance and to stabilize the product performance and the manufacturing performance thus arises, and it is an object of the present invention to solve such problem.

Means for Solving the Problems

The present invention is provided to achieve the object described above, where the invention described in claim 1 relates to a manufacturing process analysis method of a product, the analysis method including a step for collecting product data indicating a quality for every product manufactured by the manufacturing process and process data indicating manufacturing condition of the product for every manufacturing process lot; a step for standardizing the process data and converting to an intermediate function; a step for carrying out a principal component analysis with respect to the intermediate function, and deriving a principal component load amount and a principal component score of the process data; a step for applying a cluster analysis on the principal component score to classify manufacturing process lots to a plurality of groups; a step for determining relative merit for every group on the basis of the product data corresponding to the principal component score belonging to the group; and a step for specifying a hindering factor, which is process data contributing to the relative merit of the group.

According to such configuration, the manufacturing process can be efficiently improved by classifying the manufacturing process lots into a plurality of groups from the principal component score generated based on the process data, determining the relative merit of the plurality of groups based on the product data, and specifying the hindering factor contributing to the relative merit of the group.

The invention described claim 2 provides the manufacturing process analysis method in that, in addition to the configuration of the manufacturing process analysis method described in claim 1, in the step for specifying the hindering factor, the hindering factor is specified according to the principal component load amount configuring a group determined as inferior.

According to such configuration, the improvement precision of the manufacturing process can be enhanced by specifying the hindering factor of the group determined as inferior.

The invention described in one embodiment provides the manufacturing process analysis method in that, in addition to the configuration of the manufacturing process analysis method described in in another embodiment, soundness of the group is determined according to an average value of the product data in the group.

According to such configuration, as the variation of the product data in the group is averaged by determining the soundness of the group based on the average value of the product data in the group when setting a soundness determination reference, the tendency of the product data soundness among the groups can be comprehensively grasped.

The invention described in one embodiment provides the manufacturing process analysis method in that, in addition to the configuration of the manufacturing process analysis method described in other embodiments, the process data includes manufacture data indicating a manufacturing condition of the manufacturing process.

According to such configuration, as the lots are classified into a plurality of groups from the principal component score generated based on the manufacture data, and the relative merit of such groups are determined based on the product data, the manufacture data contributing to the relative merit of the group is specified, and the manufacturing process can be efficiently improved.

The invention described in an embodiment provides the manufacturing process analysis method in that, in addition to the configuration of the manufacturing process analysis method described in another embodiment, the process data includes material data indicating a condition of a raw material of the product.

According to such configuration, the manufacturing process can be more efficiently improved as the manufacture data and the material data contributing to the relative merit of the group are specified.

The invention described in an embodiment provides the manufacturing process analysis method in that, in addition to the configuration of the manufacturing process analysis method described in another embodiment, in the process of determining the relative merit for every group, propriety of a relative merit determination for every group is determined in advance.

According to such configuration, when the propriety of the relative merit determination for every group is determined and the relative merit for every group can be determined, the manufacturing process lots are classified into a plurality of groups from the principal component score generated based on the process data, the relative merit of the plurality of groups are determined based on the product data, and the hindering factor contributing to the relative merit of the group is specified, so that the manufacturing process can be efficiently improved.

The invention described in an embodiment provides the manufacturing process analysis method in that, in addition to the configuration of the manufacturing process analysis method described in another embodiment, in the step for determining the relative merit for every group, when the relative merit for every group cannot be determined, additional process data not included in the process data is newly collected, the manufacturing process lots are re-classified to a plurality of groups on the basis of the process data and the additional product data to re-determine the relative merit for every group on the basis of the product data corresponding to a principal component score belonging to the group.

According to such configuration, when the manufacturing process lots are classified to a plurality of groups from the principal component score generated based on the process data, and the relative merit of the plurality of groups are determined based on the product data, if the relative merit of the plurality of groups cannot be determined, the process data not taken into consideration are newly added and the groups are again classified and the relative merit of the groups are re-determined, and the hindering factor contributing to the relative merit of the group of after the re-determination is specified, so that the manufacturing process can be efficiently improved.

The invention described an embodiment provides the manufacturing process analysis method in that, in addition to the configuration of the manufacturing process analysis method described in another embodiment, in the step for determining the relative merit for every group, when the relative merit for every group cannot be determined, unnecessary process data included in the process data is deleted, the manufacturing process lots are re-classified to a plurality of groups on the basis of the process data excluding the unnecessary process data, and the relative merit for every group is re-determined on the basis of the product data corresponding to a principal component score belonging to the group.

According to such configuration, when the relative merit of the plurality of groups cannot be determined, the process data that is taken into consideration but does not greatly influence the result is deleted, the group is again classified and the relative merit of the group is re-determined, and the hindering factor contributing to the relative merit of the group of after the re-determination is specified, so that the manufacturing process can be efficiently improved.

Effect of the Invention

The present invention classifies the manufacturing process lots to a plurality of groups from the principal component score generated based on the process data, determines the relative merit of the plurality of groups on the basis of the product data, and specifies the hindering factor contributing to the relative merit of the group, so that the manufacturing process is efficiently improved, and the manufacturing process stably indicating satisfactory product performance and manufacturing performance can be obtained.

BRIEF DESCRIPTION OF THE DRAWINGS

FIG. 3 is view showing process data for every lot;

FIG. 4 is a view showing information amount of a principal component for every process data;

FIG. 5 is a view showing information amount of the principal component for every lot;

BEST MODE FOR CARRYING OUT THE INVENTION

To achieve the object of specifying the hindering factor that causes the variation of the product performance and to stabilize the product performance, the present invention relates to a manufacturing process analysis method of a product, the analysis method including a step for collecting product data indicating a quality of every product manufactured by the manufacturing process and process data indicating a manufacturing condition of the product for every manufacturing process lots; a step for standardizing the process data and converting to an intermediate function; a step for carrying out a principal component analysis with respect to the intermediate function and deriving a principal component load amount and a principal component score of the process data; a step for applying a cluster analysis on the principal component score to classify the manufacturing process lots to a plurality of groups; a step for determining relative merit for every group on the basis of the product data corresponding to the principal component score belonging to the group: and a step for specifying a hindering factor, which is process data contributing to the relative merit of the group.

EXAMPLES

Hereinafter, a manufacturing process analysis method according to a first example of the present invention will be described. In the following examples, when referring to number, numerical value, amount, range and the like of the configuring elements, they are not limited to a specific number other than when particularly indicated and when clearly limited to a specific number in principle, and may be greater than or equal to or smaller than or equal to the specific number.

Figure 1:
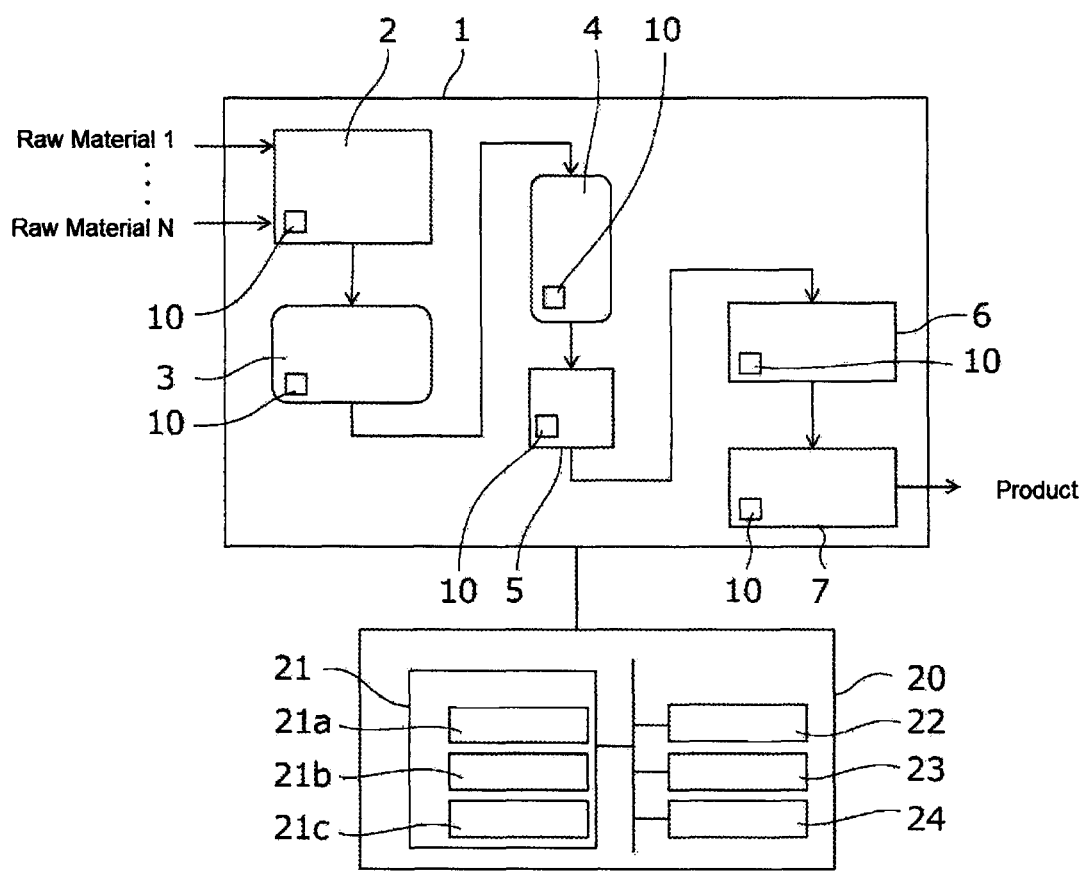
FIG. 1 is a schematic view showing a configuration of a manufacturing line for applying a manufacturing process analysis method according to a first example of the present invention.

FIG. 1 is a schematic view showing a manufacturing line of a film sheet serving as an example of the manufacturing process to apply the present invention. The product manufactured by the manufacturing process to apply the present invention is not limited to the film sheet and may be any other article.

In the manufacturing line of the film sheet, the film sheet is manufactured from a raw material through a raw material compounding process, a granulating process, a molding process, and a finishing process. The manufacturing line of the film sheet is a manufacturing device 1 configured by a measuring/mixing machine 2, a pushing machine 3, a hopper 4, a molding machine 5, a drying machine 6, and a winding machine 7.

Raw materials 1 to N such as resin are input to the measuring/mixing machine 2. The raw material in the measuring/mixing machine 2 is uniformly mixed and sent to the pushing machine 3.

The pushing machine 3 molds the mixed raw material to a granular pellet.

The pellet input to the hopper 4 is stretched in a longitudinal direction and a width direction with the molding machine 5 to be molded to a film sheet having a desired thickness.

The film sheet stretched to a sheet form is temperature raised and dried in the drying machine 6.

The dried film sheet has the thickness measured by a thickness measuring means (not shown), and then wound to a roll form with the winding machine 7.

Each equipment described above includes a sensor 10 that measures various values. The measuring target of the sensor 10 is the input amount of the raw material, the temperature of the molding machine 5, the molding speed, the thickness of the film sheet, and the like. The sensor 10 provides the measurement value to a control device 20.

The operation of each equipment is controlled by the control device 20. The control device 20 includes, a device control unit 21 including, for example, a CPU and a memory, an input/output unit 22 that controls input/output of data, a display unit 23 that displays data, and a storage unit 24 that stores data. The functions of the control device 20 may be realized by being controlled using software, or may be realized by being operated using a hardware. The control device 20 carries out processes described below on the basis of process data indicating the manufacturing condition of the product measured by the sensor 10, and the product data indicating the quality of the product (includes quality information such as strength, thickness, amount of attached foreign substance, and the like of the product, manufacturing performance such as yield, defective product occurrence rate, etc.). The process data includes manufacture data indicating the manufacturing condition of the manufacturing process (operation condition of various types of equipment configuring the manufacturing device 1), and the material data indicating the conditions of the raw materials 1 to N (physicality, composition, etc. of raw material).

The device control unit 21 includes a control portion 21a that controls each equipment, an analyzing portion 21b that carries out the processes described later for the process data of the sensor 10, and a determining portion 21c that specifies the hindering factor to be described later.

The input/output unit 22 is, for example, a keyboard and a mouse, a communication control device, a printing device, and the like. The display unit 23 includes, for example, a display. The storage unit 23 stores processing conditions used in each process of the manufacturing line, data used when data processing with the analyzing portion 21b, and the like.

Figure 2:
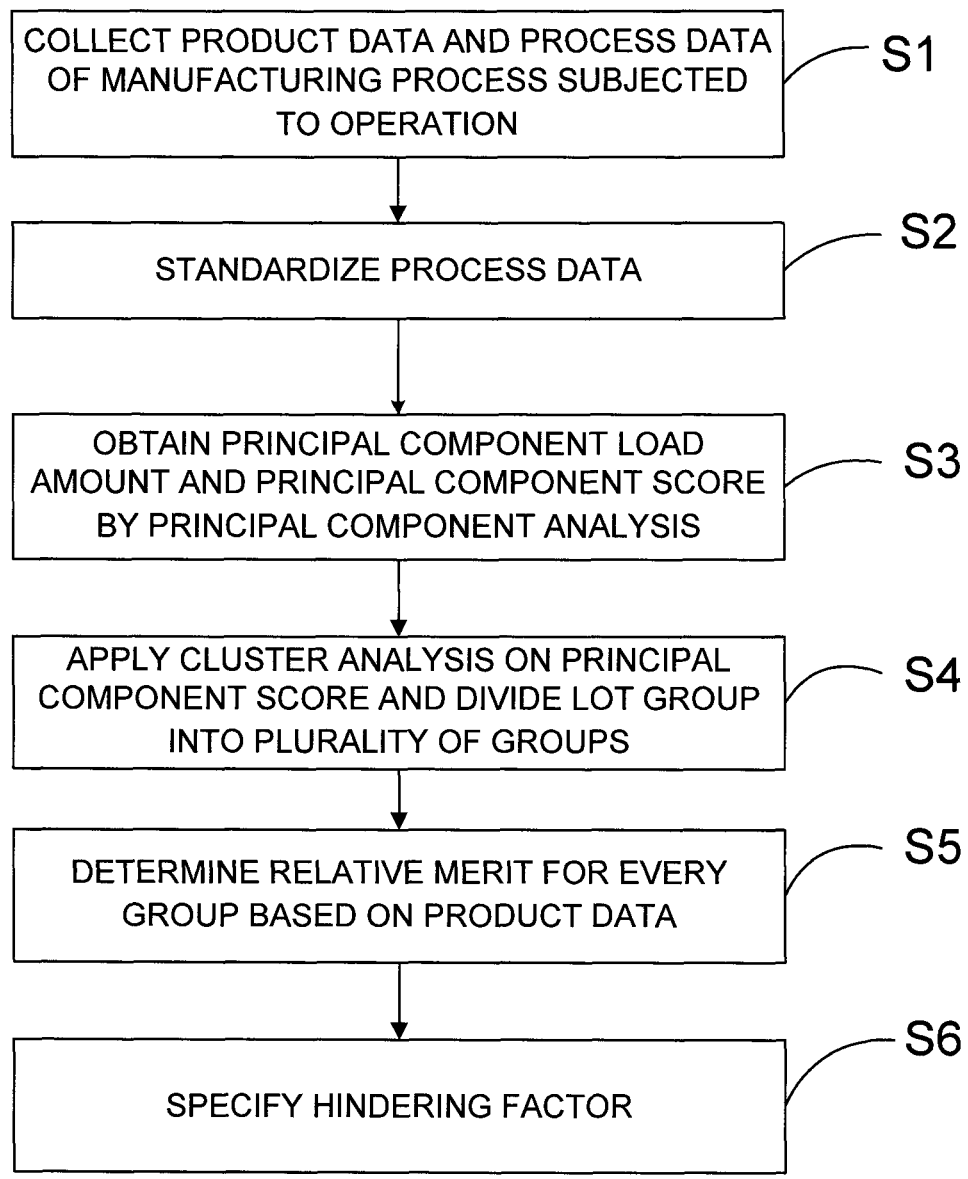
FIG. 2 is a flowchart showing the manufacturing process analysis method according to the first example of the present invention.
Figure 6:
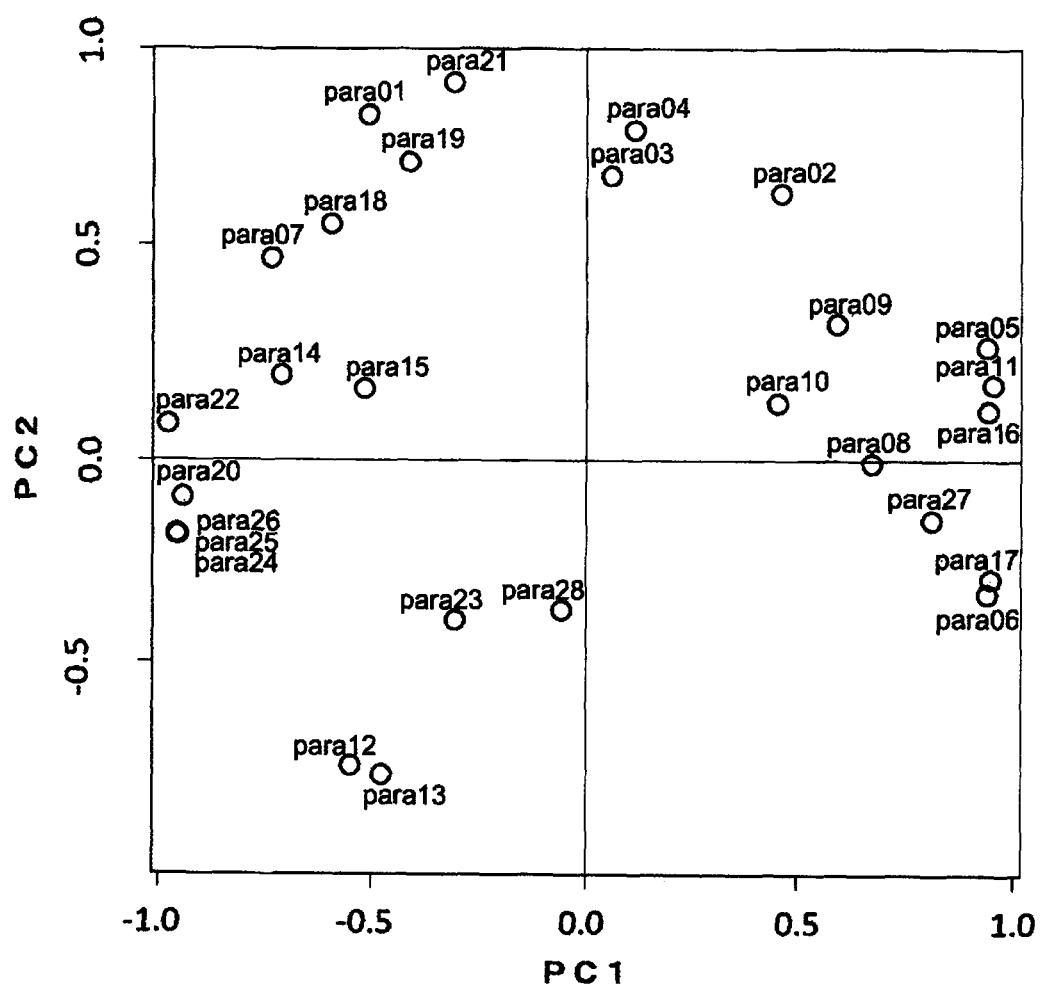
FIG. 6 is a graph in which the information amount shown in FIG. 4 is plotted to a coordinate system having a first principal component on a horizontal axis and a second principal component on a vertical axis.
Figure 7:
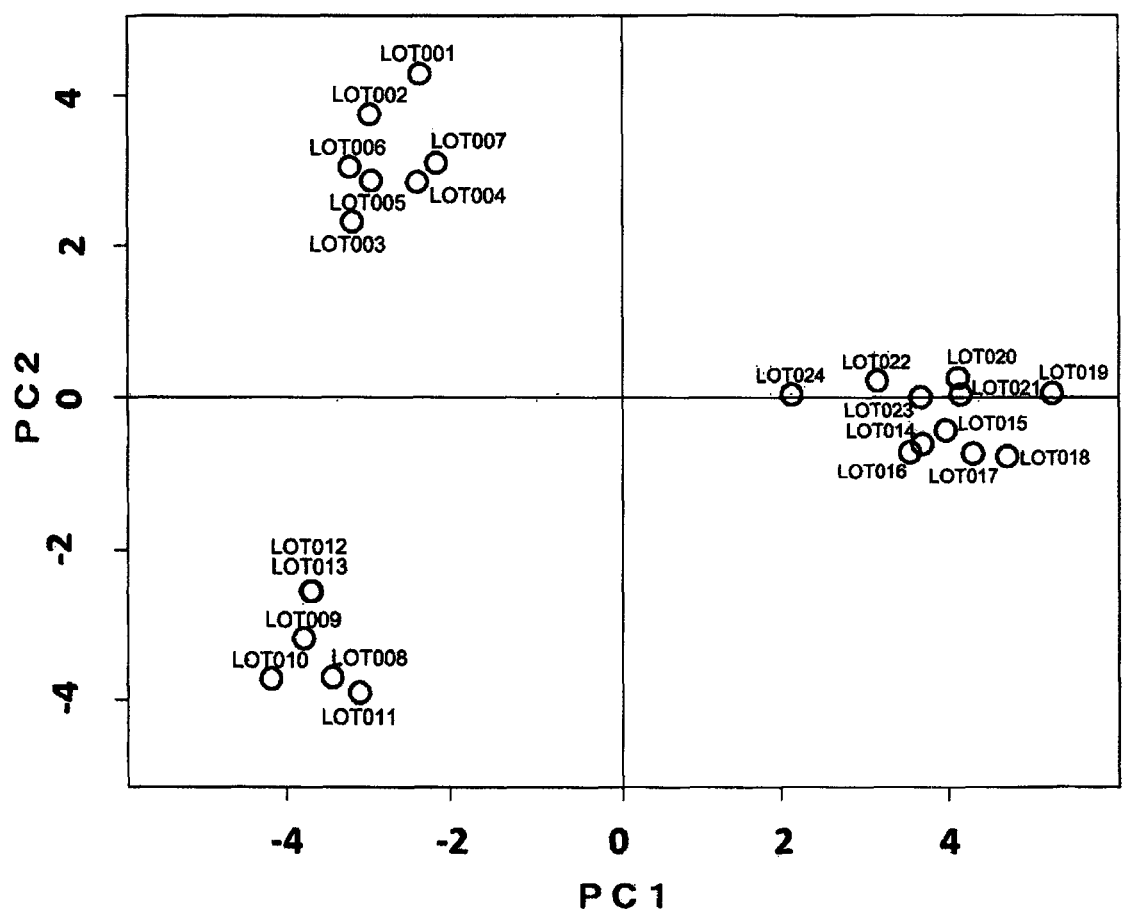
FIG. 7 is a graph in which the information amount shown in FIG. 5 is plotted to a coordinate system having the first principal component on a horizontal axis and the second principal component on a vertical axis.
Figure 8:
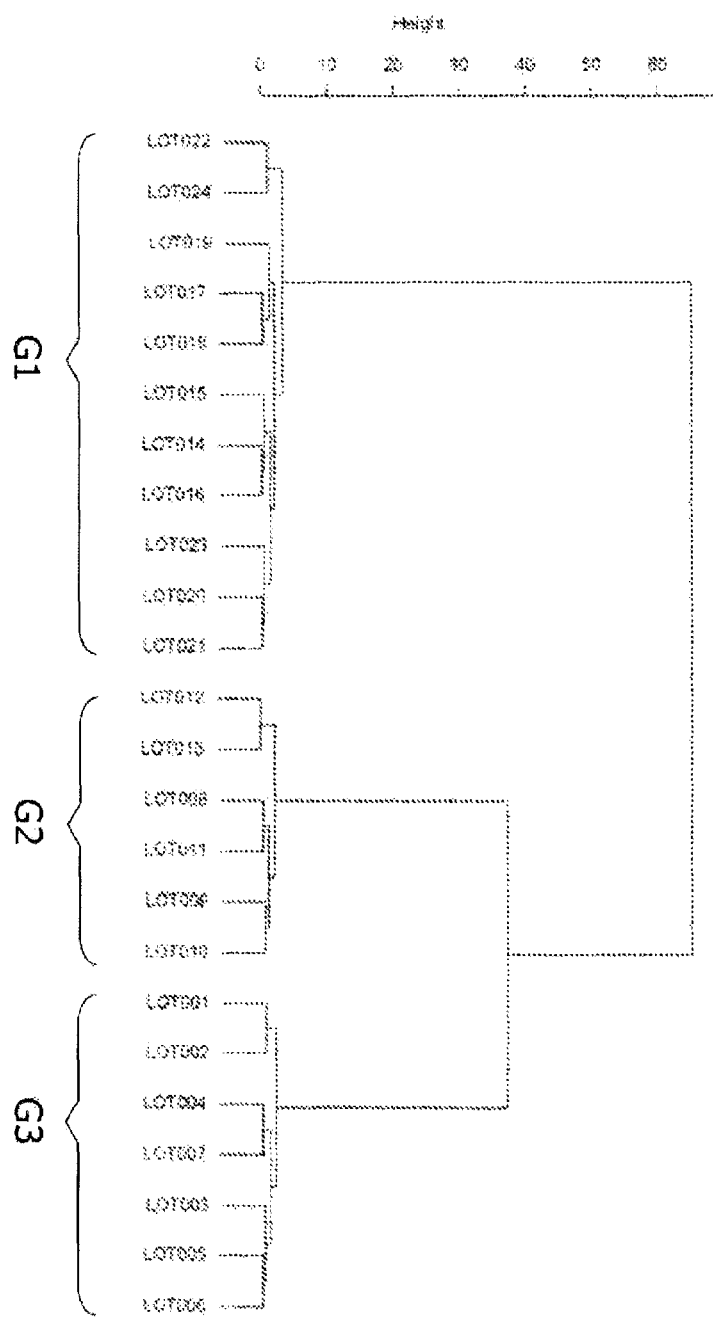
FIG. 8 is a graph showing a dendrogram obtained by applying a cluster analysis on the principal component score shown in FIG. 5.
Figure 9:
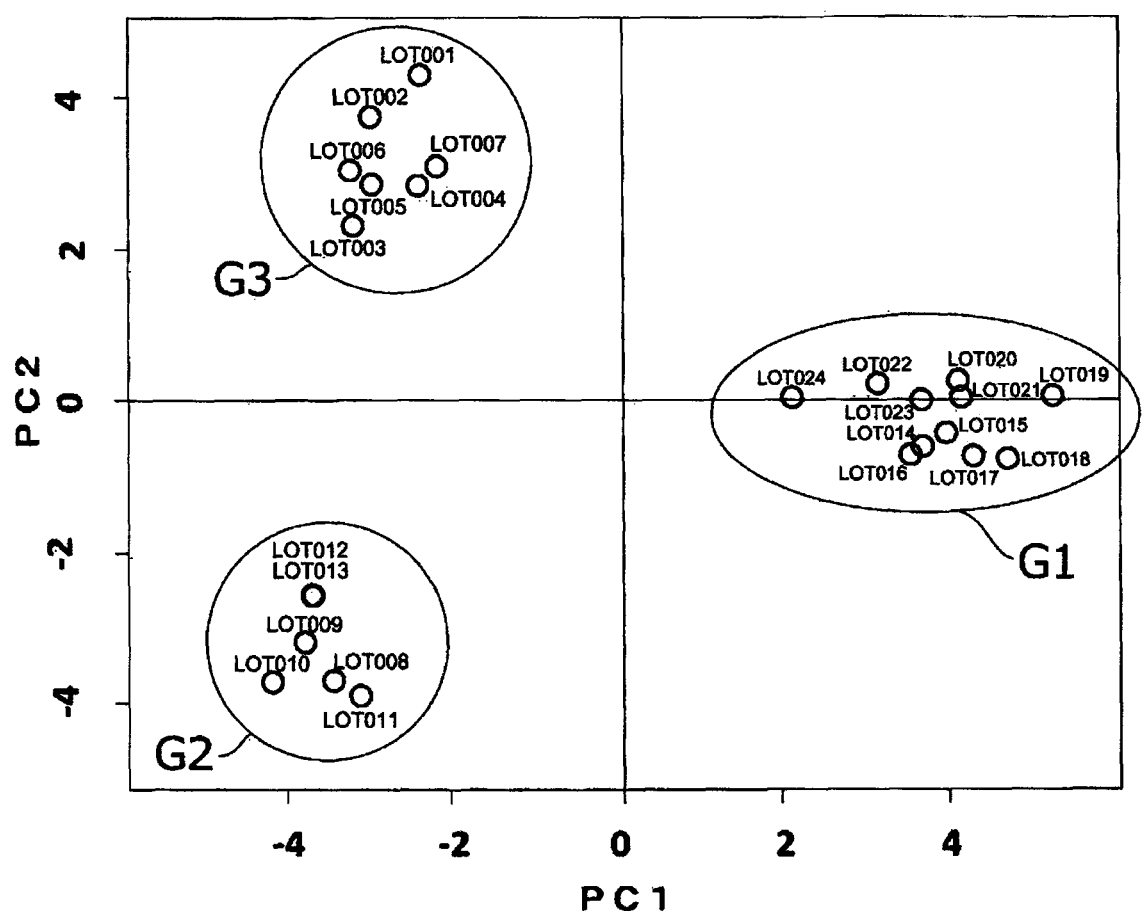
FIG. 9 is a graph showing the result of applying the analysis result of FIG. 8 to FIG. 7.

The manufacturing process analysis method according to the present example will now be described based on the drawings. FIG. 2 is a flowchart showing a manufacturing process analysis method according to a first example of the present invention. FIG. 3 is a view showing process data and product data measured for every lot of the manufacturing line. FIG. 4 is a view showing information amount of a principal component for every process data. FIG. 5 is a view showing information amount of the principal component for every lot of the manufacturing line. FIG. 6 is a graph showing a principal component load amount in which the information amount shown in FIG. 4 is plotted to a coordinate system having a first principal component on a horizontal axis and a second principal component on a vertical axis. FIG. 7 is a graph showing a principal component score in which the information amount shown in FIG. 5 is plotted to a coordinate system having a first principal component on a horizontal axis and a second principal component on a vertical axis. FIG. 8 is a view of a dendrogram obtained by applying cluster analysis on the information amount shown in FIG. 5. FIG. 9 is a graph showing a result of applying the analysis result of FIG. 8 to FIG. 7.

First, for the operated manufacturing process, the control device 20 collects the process data and the product data measured by the sensor 10 (S1). In step S1, the process data and the product data for every lot measured by the sensor 10 are stored in the storage unit 24 for a lot group including a plurality of lots that manufacture the same product of the same brand at different time and date. The process data for every lot is shown in FIG. 3. In FIG. 3, process data para01 to 28 collected in each lot are shown for lots LOT001 to 024 for 24 times. The process data para01 to 28 are receiving examination value and input amount of the raw material, the temperature and the molding speed of the molding machine 5, and the like. The product data para29 to 31 are thicknesses of the film sheet that went through the drying machine 6, where para29 is a dispersed value, para30 is an average value, and para31 is a standard deviation. In FIG. 3, some process data para06 to 27 are omitted.

Next, the process data para01 to 28 in the table shown in FIG. 3 are standardized and converted to an intermediate function (S2). In step S2, the analyzing portion 21*b* carries out a standardizing process of the process data, which is known, based on equation 1.

$$Z = \frac{x-\mu}{\sigma} \quad (x: \text{data}, \mu: \text{average value}, \sigma: \text{standard deviation}) \quad (1)$$

A principal component analyzing method is then applied to the intermediate function obtained in step 2 to obtain a principal component load amount and a principal component score (S3). Specifically, a correlation coefficient matrix in the intermediate function is created to derive a eigenvalue and an eigenvector of the correlation coefficient matrix. In the correlation coefficient matrix, a first principal component PC1 is expressed as shown with mathematical equation 2 when the intermediate function is x1, x2, x3, .... Furthermore, $N^{th}$ principal component PCn is expressed as shown with mathematical equation 3. The correlation coefficient matrix is formed by using coefficients a11, a12, a13, ... for the elements of the first row, and the coefficients an1, an2, an3, ... for the elements of the $n^{th\ row}$.

$$PC1 = a_{11} \times x_1 + a_{12} \times x_2 + a_{13} \times x_3 + \ldots \quad (2)$$

$$PCn = a_{n1} \times x_1 + a_{n2} \times x_2 + a_{n3} \times x_3 + \ldots \quad (3)$$

The principal component score is then obtained from the eigenvector of the correlation coefficient matrix. Furthermore, a contribution rate of each principal component is obtained from the eigenvalue of the correlation coefficient matrix. The contribution rate of the principal component is obtained by classifying the eigenvalue by the total sum of the eigenvalues. The first principal component, the second principal component, ... $N^{th}$ principal component are determined from the larger eigenvalue.

FIG. 4 shows the information amount of the first principal component PC1, the second principal component PC2, and the third principal component PC3 of each process data para01 to 28. In the present example, only three principal components are shown, but the number of principal components may be increased or decreased according to the contribution rate of each principal component.

Furthermore, the analyzing portion 21*b* calculates the values of the first principal component PC1, the second principal component PC2, ..., that is, the principal component score on the basis of the intermediate functions x1, x2, x3 of each lot LOT001 to 024 and each coefficient of the correlation coefficient matrix. The principal component score of each lot LOT001 to 024 is shown in FIG. 5.

Next, the cluster analysis is applied on the principal component score shown in FIG. 5 to classify the lots LOT001 to 024 into a plurality of groups (S4). In step S4, the analyzing portion 21*b* carries out the cluster analysis for the principal component score derived in step 3. Here, "cluster analysis" is a method of classifying the analyzing target data (cluster) into a plurality of groups by focusing on similarity, where hierarchical clustering, classification optimization clustering and the like are known. The "similarity" on which the cluster analysis is focused in the present example is the distance between the principal component scores of each lot. In the present example, an agglomerative hierarchical clustering, which is one of the hierarchical clustering, is used. Furthermore, the ward method, with which the solution can be stably obtained, is used for a distance calculating method between the clusters. The "ward method" selects a cluster in which an increase amount of deviation square sum of when two clusters are combined becomes a minimum. For example, when combining clusters A and B to generate cluster C, the deviation square sums Sa, Sb, Sc in the clusters A, B, C are expressed as equations 4 to 6, respectively.

$$Sa = \sum_{k=1}^{p} \sum_{i=1}^{n_a} (x_{kj}^A - \bar{x}_k^A)^2 \quad \text{Where, } \bar{x}_k^A = \frac{1}{n_a} \sum_{i=1}^{n_a} x_{kj}^A \quad (4)$$

$x_{ki}^A : i(1, 2, \ldots n_a)^{th}$ data in variable k(1, 2, ... p) belonging to cluster A $x_{ki}^A : i(1, 2, \ldots n_a)^{th}$ data in variable k(1, 2, ... p) belonging to cluster A $$Sb = \sum_{k=1}^{p} \sum_{i=1}^{n_b} (x_{ki}^B - \bar{x}_k^B)^2 \quad (5)$$

Where, $$\bar{x}_k^B = \frac{1}{n_b} \sum_{i=1}^{n_b} x_{ki}^B$$

$x_{ki}^B : i(1, 2, \ldots n_b)^{th}$ data in variable k(1, 2, ... p) belonging to cluster B $x_{ii}^B : i(1, 2, \ldots n_b)^{th}$ data in variable k(1, 2, ... p) belonging to cluster B $$Sc = \sum_{k=1}^{p} \sum_{i=1}^{n_c} (x_{ki}^C - \bar{x}_k^C)^2 = \sum_{k=1}^{p} \left[ \sum_{i=1}^{n_a} (x_{ki}^A - \bar{x}_k^C)^2 + \sum_{i=1}^{n_b} (x_{ki}^B - \bar{x}_k^C)^2 \right] \quad (6)$$

Where, $$\bar{x}_k^C = \frac{1}{n_c} \sum_{i=1}^{n_c} x_{ki}^C = \frac{n_a}{n_a + n_b} \bar{x}_k^A + \frac{n_b}{n_a + n_b} \bar{x}_k^B$$

According to the equations 4 to 6, the deviation square sum Sc in the cluster C becomes as follows.

[Equation 7]

$$Sc = Sa + Sb + \Delta Sab \quad (7)$$

$$\text{Where } \Delta Sab = \frac{n_a n_b}{n_a + n_b} \sum_{k=1}^{p} (\bar{x}_k^A - \bar{x}_k^B)^2$$

ΔSab of equation 7 is the increment of the deviation square sums of when the clusters A, B are combined to generate cluster C. Therefore, the clustering is advanced by selectively combining the clusters so that ΔSab becomes a minimum in each combining stage.

In the present example, as shown in FIG. 8, the lots LOT001 to 024 can be classified into three groups G1, G2, G3 as a result of the cluster analysis. Furthermore, the result is reflected on FIG. 7, which is shown in FIG. 9. The number of groups is not limited to three, and may be less than or equal to two or greater than or equal to four as long as it is a number that can be easily handled.

The relative merit is determined for every group (S5). In step S5, the control device 20 calls out the intermediate function obtained from the product data para29 to 31 indicating the thickness dimension of the film sheet stored in the storage unit 24 for every lot LOT001 to 024 belonging to the groups G1 to G3, and product data soundness is determined. The product data soundness is preferably determined on the basis of an average value of the group. Thus, the variation of the product data in the group is equalized, and the tendency of the product data soundness between the groups can be comprehensively grasped. The product data soundness may be determined on the basis of the magnitude of the deviation of the product data in the group or the big and small of the difference (range) of the maximum value and the minimum value, or may be determined by combining two or more of the average value, the deviation, the R value, or the like. When determining the product data soundness by combining the average value and the deviation, for example, that in which the deviation in the group is small is assumed to be determined as good when the average value in the group is the same. Thus, the tendency of the product data soundness between the groups taking into consideration the variation of the product data in the group can be comprehensively grasped. The analyzing portion 21b then compares the product data for every group G1 to G3, determines the relative merit among the groups G1 to G3, and stores the result in the storage unit 24. In the present example, group G1 indicates the best product data, and the product data degrades in the order of G3, G2, and hence the relative merit among the groups are determined to be in the order of groups G1, G3, G2.

Figure 10:
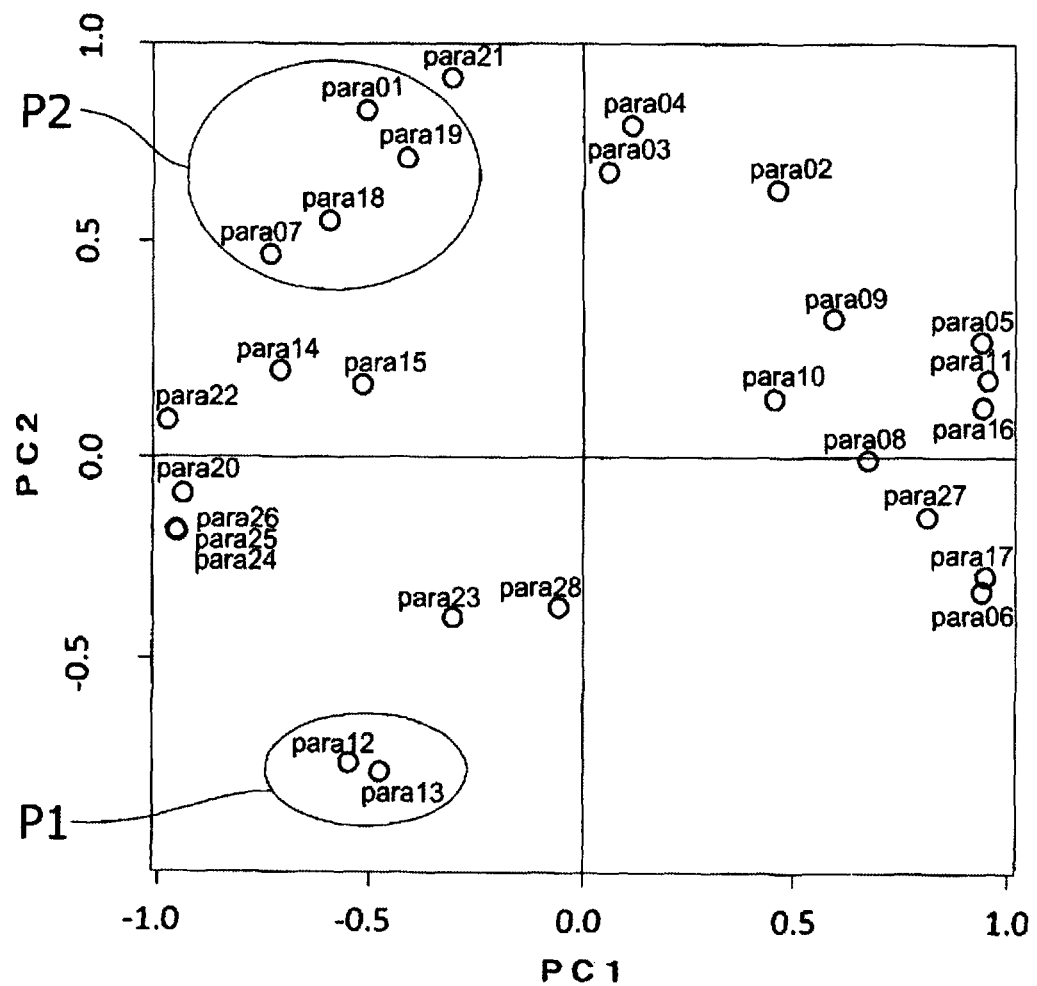
FIG. 10 is a graph showing a hindering factor contributing to a relative merit of groups.

The hindering factor contributing to the relative merit of the groups G1 to G3 is then specified (S6). In step S6, focusing on a characteristic arrangement relationship of the groups G1 to G3 on the coordinate system (hereinafter referred to as "PC1, 2 coordinate system") of the first principal component PC1 and the second principal component PC2, the process data para01 to 28 corresponding to such position in the principal component load amount are specified as the hindering factor, which is the process data contributing to the relative merit of the groups G1 to G3. Specifically, the determining portion 21c reads that the characteristic arrangement on the PC1, 2 coordinate system of the group G2 determined as inferior, that is, the first principal component PC1 coordinate on the PC1, 2 coordinate system is negative, and that the second principal component PC2 coordinate is negative. The determining portion 21c then reads that the process data corresponding to the characteristic arrangement on the PC1, 2 coordinate system of the group G2 from the principal component load amount shown in FIG. 10. The determining portion 21c determines the process data (para12, 13, etc.) present in a third quadrant on the PC1, 2 coordinate system of the principal component load amount as a first hindering factor P1.

Furthermore, similar analysis is carried out on the group G3 determined as next inferior to group G2, and the process data (para01, 07, 18, 19, etc.) present in the second quadrant on the PC1, 2 coordinate system of the principal component load amount shown in FIG. 6 is determined as a second hindering factor P2 on the basis of the characteristic arrangement (second quadrant) of group G3 on the PC1, 2 coordinate system. Thus, the improvement precision of the manufacturing process enhances by specifying a plurality of hindering factors on the basis of a plurality of groups.

In the present example, the manufacture data and the material data are similarly processed, but if the product data can be predicted with only the manufacture data, the material data may be appropriately excluded from the processing target.

As described above, the manufacturing process can be efficiently improved by classifying the manufacturing process lots into a plurality of groups from the principal component score generated on the basis of the process data, determining the relative merit of the plurality of groups on the basis of the product data, and specifying the hindering factor contributing to the relative merit of the group.

Furthermore, the improvement precision of the manufacturing process can be enhanced by specifying the hindering factor of the group determined as inferior.

Therefore, as the manufacturing process can be efficiently improved, the manufacturing process that stably demonstrates satisfactory product performance and manufacturing performance can be obtained.

Figure 11:
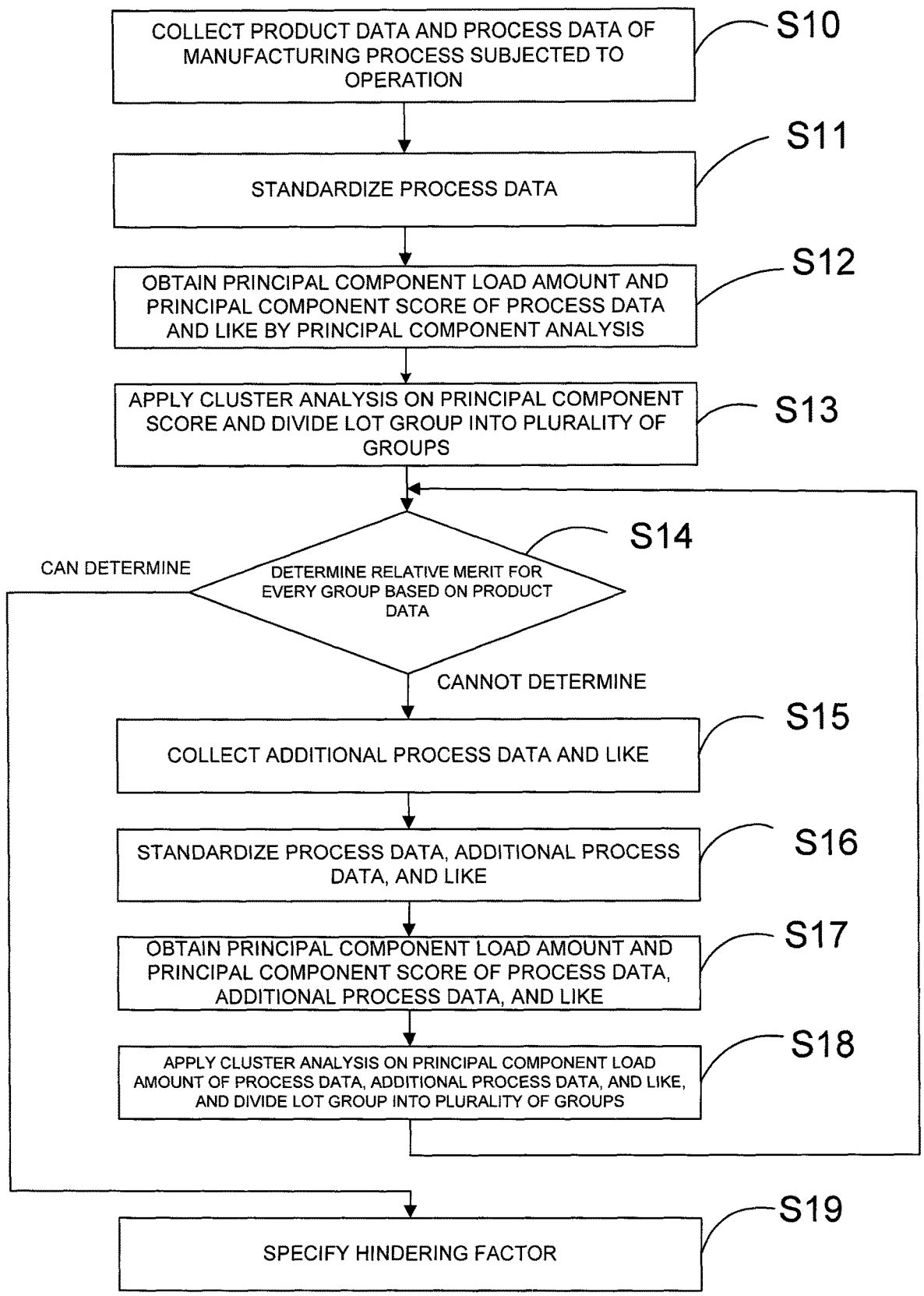
FIG. 11 is a flowchart showing an a manufacturing process analysis method according to a second example of the present invention.

Now, a manufacturing process analysis method according to a second example of the present invention will be described on the basis of the drawings. FIG. 11 is a flowchart showing the manufacturing process analysis method according to the second example of the present invention. In the description related to the present example below, the description redundant with the description related to the first example described above will be omitted.

First, the manufacturing process lots are classified into a plurality of groups through a procedure similar to steps S1 to 4 of the first example described above (S10 to 13).

Next, the relative merit among the plurality of groups is determined (S14). If the relative merit among the plurality of groups cannot be determined, that is, if a plurality of pieces of product data in each group are compared and the product data soundness among the groups cannot be confirmed (No in step S14), the process data (hereinafter referred to as "additional process data") not included in the process data described above are newly collected (S15). The determination on whether or not the product data soundness among the groups can be confirmed is such that, for example, if all the average values of the product data of each group do not present a problem in terms of quality of the manufacturing process, the product data soundness among the groups is determined as not being able to be confirmed, and if at least one of the average value of the product data of each group presents a problem in terms of quality of the manufacturing process, determination may be made that the product data soundness among the groups can be confirmed, but this is not the sole case.

Next, the analyzing portion 21b standardizes the process data collected in step S10 and the additional process data collected in step S15 and converts the same to the intermediate function based on equation 1 (S16).

Next, the analyzing portion 21b creates a correlation coefficient matrix in the intermediate function obtained in step 16, derives an eigenvalue and an eigenvector of the correlation coefficient matrix, and obtains a principal component load amount and a principal component score from the eigenvector (S17). The specific-calculating method of the principal component load amount and the principal component score is similar to step S3.

The cluster analysis is then applied to the principal component score obtained in step S17, to re-classify the lots into a plurality of groups (S18). The specific method of classifying the lots into a plurality of groups is similar to step S4.

The process is returned back to step S14, and the relative merit among the groups is again determined. When the relative merit among the plurality of groups can be determined, that is, when the average value of the plurality of pieces of product data included in each group can be compared and the soundness can be checked for the product data among the groups (Yes of step S14), the process data corresponding to the relevant position on the principal component load amount is specified as the hindering factor, which is the process data that contributes to the relative merit of the groups focusing on the characteristic arrangement relationship of the groups, similar to step S6 (S19). When the relative merit of the groups cannot be determined, steps S15 to S18 are again repeated.

Step S14 of determining the relative merit among the plurality of groups will be described in more detail based on FIGS. 12 and 13.

Figure 12:
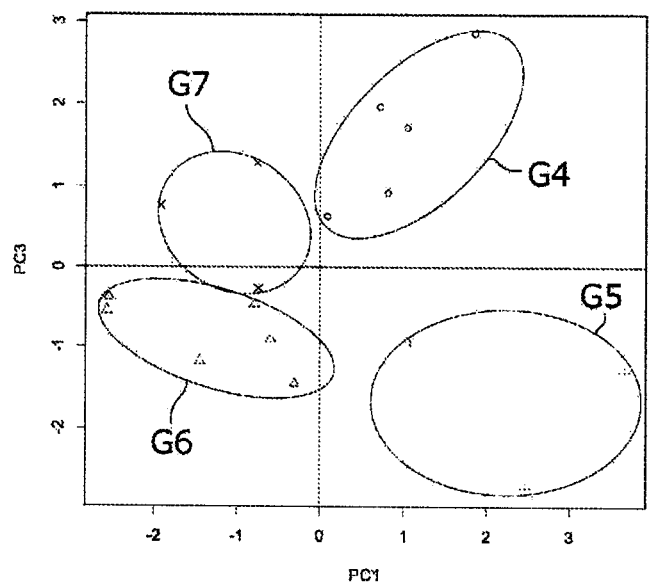
FIG. 12 is a graph showing a case in which the relative merit among the groups cannot be confirmed in the principal component score.

FIG. 12 is a view in which the principal component analysis is applied to the process data of only the conditions of the manufacturing device and the information amount is plotted to a coordinate system having the first principal component on the horizontal axis and the third principal component on the vertical axis with respect to 17 lots. In FIG. 12, the 17 lots are classified into four groups G4 to G7, and the lots configuring each group are indicated with reference symbols ○, Δ, × and + in FIG. 12. The average value of the viscosity of the groups G4 to G7 is 1028cp for group G4, 1027cp for group G5, 1052cp for group G6 and 1023cp for group G7, and the soundness of the viscosity among the groups G4 to G7 cannot be confirmed.

Figure 13:
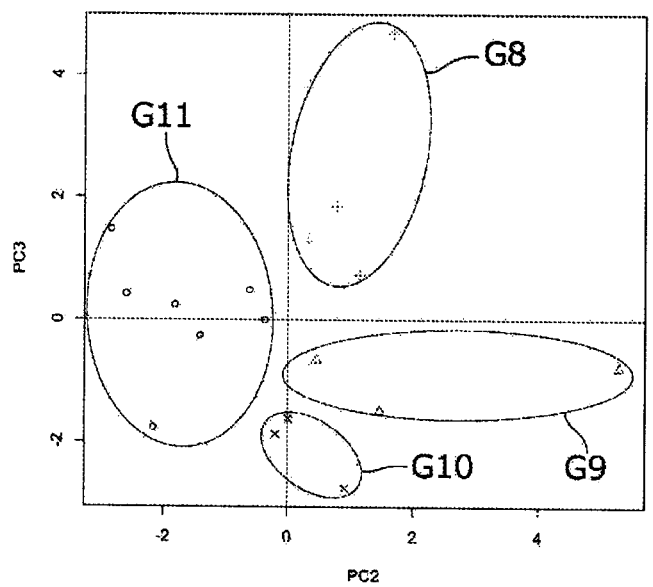
FIG. 13 is a graph showing a case in which material data is added and the relative merit among the groups can be confirmed in the principal component score.

Next, with respect to the same lots as FIG. 12, the material data serving as the additional process data are collected, steps S13 to S18 are carried out for the process data and the material data, and the information amount is plotted on the coordinate system having the second principal component on the horizontal axis and the third principal component on the vertical axis, which is shown in FIG. 13. In FIG. 13, the 17 lots are classified into four groups G8 to G11, and the lots configuring each group are indicated with reference symbols ○, Δ, × and + in FIG. 13. The average value of the viscosity of the groups G8 to G11 is 980cp for group G8, 1077cp for group G9, 1023cp for group G10 and 1054cp for group G11, and as the viscosity of group G8 is better than the viscosity of the other groups, group G8 can be determined as being superior than groups G9 to G11.

Furthermore, step S14 may determine the propriety of the relative merit determination for every group prior to the determination of the relative merit for every group. When determining the propriety of the relative merit determination for every group, for example, determination is assumed to be made that the relative merit determination is good with some conditions if all the average values of the product data of each group do not present any problem in terms of quality of the manufacturing process and the plurality of groups can be further distinguished by the manufacturing condition (aspect of material, load amount, temperature and humidity, etc.), but this is not the sole case.

Figure 14:
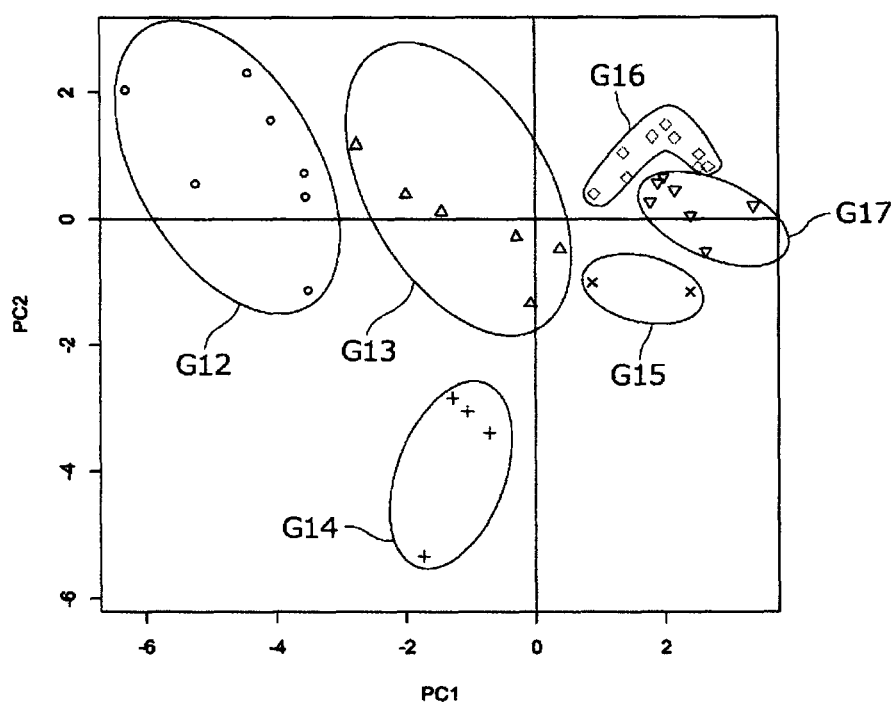
FIG. 14 is a graph showing a case in which the relative merit among the groups can be confirmed according to the manufacturing condition in the principal component score.

A case of determining the soundness of the relative merit determination for every group will be specifically described. When the manufacturing process is classified into a plurality of groups on the basis of steps S10 to S13, a plurality of groups in which the average value of the product data does not present any problems in terms of quality may exist, as shown in FIG. 14. FIG. 14 is a view in which the principal component analysis is applied to the process data of only the conditions of the manufacturing device and the information amount is plotted to a coordinate system having the first principal component on the horizontal axis and the second principal component on the vertical axis with respect to 37 lots. In FIG. 14, the 37 lots are classified into six groups G12 to G17, and the lots configuring each group are indicated with reference symbols ○, Δ, +, ×, ◇, and ∇ in FIG. 14. The average value of the viscosity of the groups G12 to G17 is 5443cp for group G12, 5600cp for group G13, 5475cp for group G14 and 5250cp for group G15, 5450cp for group G16, and 5600cp for group G17, where the group exceeding the viscosity does not present any problem in terms of quality is groups G13 and G17. Therefore, it can be seen that groups G13 and G17 are superior to the other groups G12, G14, G15, G16, but which one of the groups G13, G17 is more superior cannot be determined with only the product data soundness.

When the groups G13, G17 can be distinguished with the manufacturing condition, for example, when groups G12 to G14 are manufactured at low temperature drying time and groups G15 to G17 are manufactured at high temperature humid time, determination is made that group G13 can be determined as superior at low temperature drying time and determination is made that group G17 can be determined as superior at high temperature humid time.

When the relative merit determination for every group can be made according to the manufacturing condition, the product data soundness among the groups can be confirmed according to the manufacturing condition (Yes in step S14), and focusing on the characteristic arrangement relationship of the group, the process data corresponding to the relevant position on the principal component load amount can be specified as the hindering factor, or the process data contributing to the relative merit of the group, similar to step S6 (S19).

When the groups G13, G17 cannot be distinguished with the manufacturing condition, determination is made that the relative merit determination among the plurality of groups cannot be made (No in step S14), and the process proceeds to step S15.

In step S15, when the relative merit determination among the plurality of groups cannot be made, the additional process data are newly collected, but the unnecessary process data (hereinafter referred to as "unnecessary process data") included in the process data may be deleted, the manufacturing process lots may be re-classified to a plurality of groups on the basis of the process data excluding the unnecessary process data, and the relative merit for every group may be re-determined on the basis of the product data corresponding to the principal component score belonging to the group. Selecting that in which the vector component is relatively small for the unnecessary process data can be considered as a method of extracting the unnecessary process data, but this is not the sole case.

When the manufacturing process lots are classified into a plurality of groups from the principal component score generated on the basis of the process data, and the relative merit of the plurality of groups is determined on the basis of the product data, if the relative merit among the plurality of groups cannot be confirmed, the manufacturing process can be efficiently improved by newly adding the process data not taken into consideration until now, re-classifying the group, re-determining the relative merit of the groups, and specifying the hindering factor contributing to the relative merit of the groups after the re-determination.

In the present example, the material data is adopted for the additional process data, but it should be apparent that the additional process data is not limited thereto, and the additional process data can be selected according to the manufacturing process.

The present invention can be variously modified without deviating from the spirit of the invention, and it should be recognized that the present invention includes all such modifications.

DESCRIPTION OF SYMBOLS 1 manufacturing device
2 measuring/mixing machine
3 pushing machine
4 hopper
5 molding machine
6 drying machine
7 winding machine
10 sensor
20 control device
21 device control unit
21a control portion
21b analyzing portion
21c determining portion
22 input/output unit
23 display unit
24 storage unit

What is claimed is:

1. A manufacturing process analysis method of a product, the analysis method comprising:
   a step for collecting product data indicating a quality for every product manufactured by the manufacturing process and process data indicating manufacturing condition of the product for each of manufacturing process lots;
   a step for standardizing the process data and converting to an intermediate function;
   a step for carrying out a principal component analysis with respect to the intermediate function, and deriving a principal component load amount and a principal component score of the process data;
   a step for applying a cluster analysis on the principal component score to classify the manufacturing process lots into a plurality of groups;
   a step for determining a relative merit for every group on the basis of the product data corresponding to the principal component score belonging to the group;
   a step for specifying a hindering factor, which is process data contributing to the relative merit of the group; and
   a step for controlling the hindering factor in the manufacturing process so that the manufacturing process is improved and manufacturing process stability is obtained for the product.

2. the manufacturing process analysis method according to claim 1, wherein in the step for specifying the hindering factor, the hindering factor is specified according to the principal component load amount configuring a group determined as inferior.

3. the manufacturing process analysis method according to claim 1, wherein a soundness of the group is determined according to an average value of the product data in the group.

4. The manufacturing process analysis method according to claim 1, wherein the process data includes manufacture data indicating a manufacturing condition of the manufacturing process.

5. The manufacturing process analysis method according to claim 4, wherein the process data includes material data indicating a condition of a raw material of the product.

6. The manufacturing process analysis method according to claim 1, wherein in the step for determining the relative merit for every group, propriety of a relative merit determination for every group is determined in advance.

7. A manufacturing process analysis method of a product, the analysis method comprising:
   a step for collecting product data indicating a quality for every product manufactured by the manufacturing process and process data indicating manufacturing condition of the product for each of manufacturing process lots;
   a step for standardizing the process data and converting to an intermediate function;
   a step for carrying out a principal component analysis with respect to the intermediate function, and deriving a principal component load amount and a principal component score of the process data;
   a step for applying a cluster analysis on the principal component score to classify the manufacturing process lots into a plurality of groups;
   a step for determining a relative merit for every group on the basis of the product data corresponding to the principal component score belonging to the group;
   a step for specifying a hindering factor, which is process data contributing to the relative merit of the group;
   wherein in the step for determining the relative merit for every group, when the relative merit for every group cannot be determined, additional process data not included in the process data is newly collected, the manufacturing process lots are re-classified into a plurality of groups on the basis of the process data and the additional product data, and the relative merit for every group is re-determined on the basis of the product data corresponding to a principal component score belonging to the group; and
   a step for controlling the hindering factor in the manufacturing process so that the manufacturing process is improved and manufacturing process stability is obtained for the product.

8. A manufacturing process analysis method of a product, the analysis method comprising:
   a step for collecting product data indicating a quality for every product manufactured by the manufacturing process and process data indicating manufacturing condition of the product for each of manufacturing process lots;
   a step for standardizing the process data and converting to an intermediate function;
   a step for carrying out a principal component analysis with respect to the intermediate function, and deriving a principal component load amount and a principal component score of the process data;
   a step for applying a cluster analysis on the principal component score to classify the manufacturing process lots into a plurality of groups;
   a step for determining a relative merit for every group on the basis of the product data corresponding to the principal component score belonging to the group;
   a step for specifying a hindering factor, which is process data contributing to the relative merit of the group;
   wherein in the step for determining the relative merit for every group, when the relative merit for every group cannot be determined, unnecessary process data included in the process data is deleted, the manufacturing process lots are re-classified to a plurality of groups on the basis of the process data excluding the unnecessary process data, and the relative merit for every group is re-determined on the basis of the product data corresponding to a principal component score belonging to the group; and a step for controlling the hindering factor in the manufacturing process so that the manufacturing process is improved and manufacturing process stability is obtained for the product.

* * * * *